US008935621B1

(12) United States Patent
Lounsbury et al.

(10) Patent No.: US 8,935,621 B1
(45) Date of Patent: Jan. 13, 2015

(54) SYSTEMS AND METHODS FOR SELECTING COMPONENTS FOR INCLUSION IN PORTIONS OF A DISPLAYABLE FILE

(75) Inventors: Brett E. Lounsbury, Edmonds, WA (US); Samuel A. Minter, Bellevue, WA (US); Vishal M. Shanbhag, Seattle, WA (US); Jeffrey B. Slosberg, Seattle, WA (US); Michal M. Brye, Seattle, WA (US); Daniel B. Lloyd, Mercer Island, WA (US); Joseph Steven Mate, West Palm Beach, FL (US); Tri M. Cao, Seattle, WA (US); Stephen B. Ivie, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 901 days.

(21) Appl. No.: 12/782,613

(22) Filed: May 18, 2010

(51) Int. Cl.
*G06F 3/00* (2006.01)
(52) U.S. Cl.
USPC ........... 715/760; 715/739; 715/745; 715/811; 715/812; 715/825
(58) Field of Classification Search
None
See application file for complete search history.

(56) References Cited

U.S. PATENT DOCUMENTS

| | | | | |
|---|---|---|---|---|
| 7,231,608 B1* | 6/2007 | Fano et al. | ..................... | 715/760 |
| 7,356,477 B1* | 4/2008 | Allan et al. | .................. | 705/14.4 |
| 7,594,189 B1 | 9/2009 | Walker et al. | | |
| 8,219,447 B1 | 7/2012 | Ieong et al. | | |
| 2002/0152239 A1* | 10/2002 | Bautista-Lloyd et al. | ..... | 707/513 |
| 2003/0105682 A1* | 6/2003 | Dicker et al. | ..................... | 705/27 |
| 2005/0132296 A1* | 6/2005 | Milic-Frayling et al. | ..... | 715/745 |
| 2006/0059063 A1* | 3/2006 | LaComb et al. | ................. | 705/35 |
| 2007/0276537 A1* | 11/2007 | Walker et al. | .................. | 700/238 |
| 2009/0271283 A1* | 10/2009 | Fosnacht et al. | ................ | 705/26 |
| 2011/0093796 A1* | 4/2011 | Plummer et al. | .............. | 715/753 |

OTHER PUBLICATIONS

U.S. Appl. No. 10/393,505, filed Mar. 19, 2003, Dicker et al.
Deng, Kun, et al., "Bandit-Based Algorithms for Budgeted Learning", IEEE Computer Society, 2007, pp. 463-468.
Kapoor, Aloak, et al., "Budgeted Learning of Bounded Active Classifiers", UBDM, Aug. 24, 2005, 9 pages.
Vermorel, Joannes et al., "Multi-armed Bandit Algorithms and Empirical Evaluation", ECML, 2005, LNAI 3720, pp. 437-448, 2005.

\* cited by examiner

*Primary Examiner* — Anil N Kumar
(74) *Attorney, Agent, or Firm* — Knobbe, Martens, Olson & Bear, LLP

(57) ABSTRACT

Systems and methods are provided for selecting components to include in portions of a displayable file. Selecting the components may include determining an order of the components for each portion of the displayable file. The components' order for a given portion may be based on a score for each component, where a component's score is based on an estimated value and standard error associated with the component. The component to include in each portion of the displayable file may be selected based at least in part on the determined component order for each portion and a predetermined priority of each portion.

19 Claims, 8 Drawing Sheets

SYSTEMS AND METHODS FOR SELECTING COMPONENTS FOR INCLUSION IN PORTIONS OF A DISPLAYABLE FILE

BACKGROUND

In statistics, a "multi-armed bandit" problem (referencing the "one-armed bandit" term used for a slot machine) consists of determining which one of multiple "arms" or levers to select in each of a series of trials, where each lever provides a reward drawn from a distribution associated with that specific lever. The objective is generally to maximize the total reward earned through a sequence of pulls of the levers. Generally, one has no initial knowledge about the levers prior to the first trial. The decision of which lever to select at each trial involves a tradeoff between "exploitation" of the lever that has the highest expected reward based on previous trials, and "exploration" to get more information about the expected reward of each lever. While various strategies have been developed to provide approximate solutions to versions of the multi-armed bandit problem, these solutions often have limited applicability to specific real world circumstances due to their reliance on certain constraints or assumptions regarding the underlying problem.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
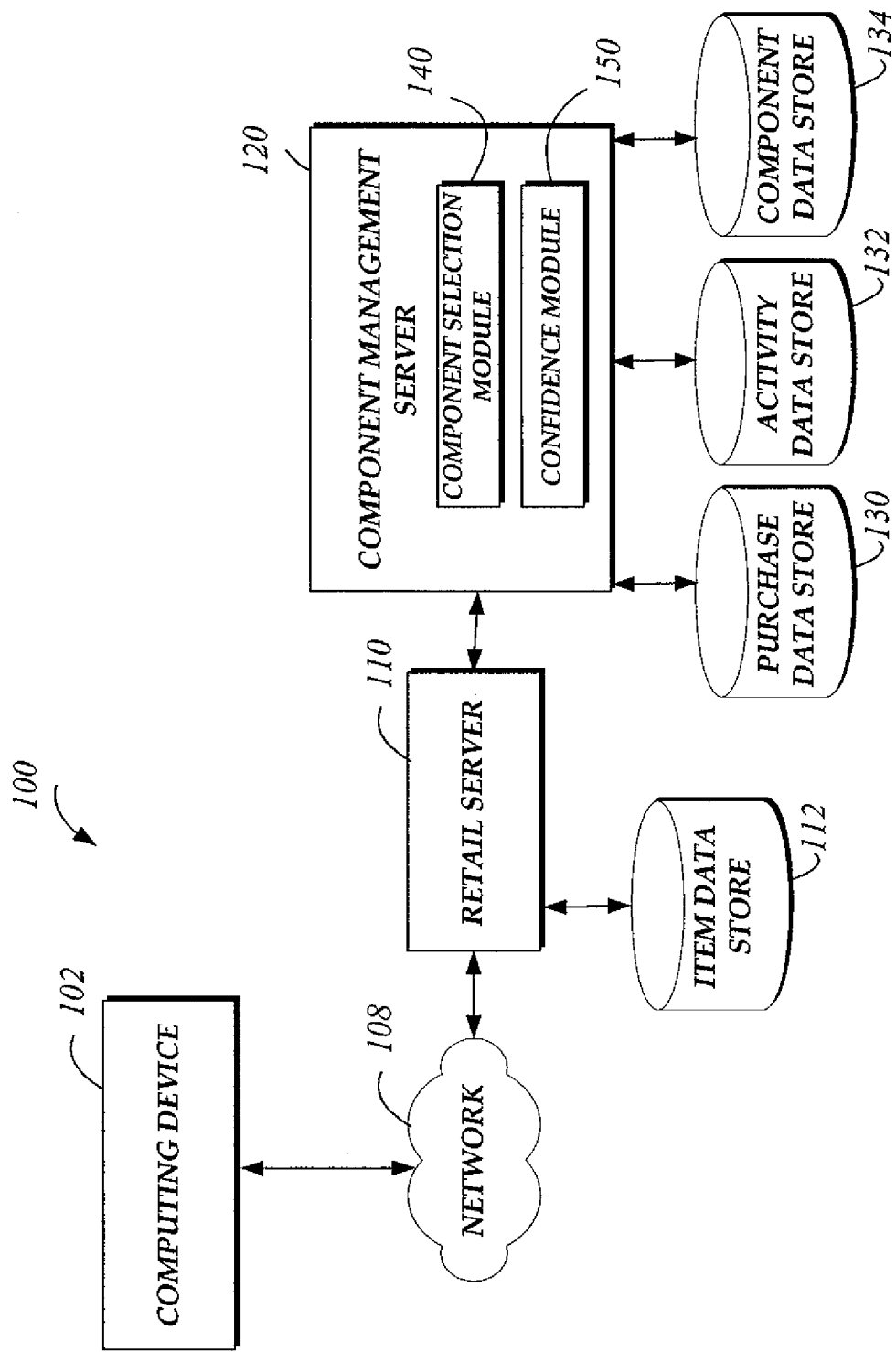
FIG. 1 is a block diagram depicting an illustrative operating environment for selecting components for inclusion in portions of a displayable file.

The present disclosure generally relates to the use of computer learning methods for identifying components that are likely to produce content that results in a desired user action when included in a portion of a displayable file, such as a web page. A "component" may be a code module or service capable of producing content which may be placed in a portion of a displayable file. For example, a component selected for inclusion in a portion of a displayable file, such as a web page, may dynamically generate content that contains links, buttons or other controls for allowing users to perform specific actions, such as adding a displayed item to a shopping cart. While the present disclosure often uses the example of a component as a code module that dynamically generates content, in some embodiments, a component may consist of static content.

In selecting components to incorporate content into portions of a displayable file, it is generally desirable to present the most effective set of components to the user. The effectiveness of presenting a component can be a measure of whether a desired result is obtained from the user and/or whether a desired action is performed by the user. The desired action or result can be any action or result that may be desired from a user once the user has viewed the displayable file. For example, a desired action may be the user selecting a portion of the content displayed by a given component, or the user eventually purchasing an item displayed by a given component.

Selecting a component for inclusion in a portion of a displayable file may be thought of as variation of the multi-armed bandit problem discussed above. For example, if a given component selection problem involves selecting a component from among a set of components in order to display content in a displayable file, each component in the set may be thought of as an "arm" in a multi-armed bandit problem. Selecting an arm to display content, therefore, may be thought of as "pulling" that arm. However, a component selection problem may differ from the traditional multi-armed bandit problem in various ways, such that known approximate solutions to the traditional multi-armed bandit problem may not be well suited to a component selection problem. One approach to the multi-armed bandit problem, which may be referred to as the "Biased Robin" approach, involves assigning an estimated value with a standard error to each arm. If one were to know the true value of all arms, then the best solution would be to pull the highest value all of the time. This is not the case, so the Biased Robin method uses an estimated value and standard error associated with each arm to statistically decide which one to pull. For example, for each arm, the Biased Robin method selects a random Gaussian distributed number that has a mean value of the arm's estimated value, and a standard deviation equal to the arm's standard error. A Gaussian distributed number is used so that selected values follow a normal distribution instead of a uniform distribution (for example, about 68% of the values will fall within one standard deviation of the estimated value, about 95% will fall within two standard deviations of the estimated value, and about 99.7% will fall within three standard deviations of the estimated value). The Biased Robin method then selects or "pulls" the arm with the highest resulting number. The result of the pull is immediately available and is then used to change or update the estimated value and standard error for the selected arm.

While Biased Robin is a good approach to the traditional multi-armed bandit problem, it may not be well suited to the component selection problem. For example, component selection, depending on the specific instance or embodiment, may differ from the traditional multi-armed bandit problem in at least one of the following ways: (1) more than one component may need to be selected, such that a different component is included in each portion of a displayable file (portions are illustrated, for example, in FIG. 3, discussed below); (2) the components may not be independent of each other, for example because one component may "steal" content from another; (3) whether a component was successful in a given trial may not be immediately known; (4) a component's true value may not be constant, for example because a code module associated with the component may be modified between trials; (5) the set of components may not be constant, as new components may be added between trials; and (6) a given component may not always be available during every trial. Each of these aspects of the component selection problem are discussed in more detail below, along with approaches to solving the various aspects of the problem.

In certain embodiments in which one or more of the above issues are present, selecting components for inclusion in two or more portions of a displayable file may include determining an order of the components for each portion of the displayable file. The components' order for a given portion may be based on a score for each component, where a component's score is a random normally distributed number based on an estimated value and standard error associated with the component. Once a component order has been determined for each portion of the displayable file, the component to include in each portion of the displayable file may be selected based at least in part on the determined component order for each portion and a predetermined priority of each portion, where the component selected for a given portion of the displayable file is the highest ordered available component that has not been previously selected for another portion having a higher predetermined priority.

FIG. 1 is a block diagram depicting an illustrative operating environment for selecting components for inclusion in portions of a displayable file. The illustrative operating environment includes a component management server 120 for selecting and managing components to be displayed in portions of a displayable file. The component management server 120 may include a component selection module 140 for selecting components to include in portions of a displayable file, and a confidence module 150 for managing the confidence information regarding the components. The illustrated environment also includes a retail server 110 that facilitates electronic browsing and/or purchasing of goods and services using various user devices, such as computing device 102. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, and the like.

The retail server 110 may be connected to or in communication with an item data store 112 that stores information associated with items available for browse and/or purchase. Item data stored in item data store 112 may include any information related to an item, such as an item available for purchase, that may be of interest to a user or may be useful for classifying or recommending an item. For example, item data may include, but is not limited to, price, availability, title, item identifier, item feedback (e.g., user reviews, ratings, etc.), item image, item description, item attributes, etc. While the item data store 112 is depicted in FIG. 1 as being local to retail server 110, those skilled in the art will appreciate that the item data store 112 may be remote to the retail server 110, and/or may be a network-based service itself.

The component management server 120 may be connected to or in communication with a purchase data store 130 that stores information associated with completed purchases, such as information identifying the items included in an order, a session identifier, information identifying the user or customer, shipping information, etc. The component management server 120 may additionally be connected to or in communication with an activity data store 132 that stores information associated with users' browsing or viewing activities, such as information regarding the pages or files that a user viewed and the content selected by a user in a given session. The component management server 120 may additionally be connected to or in communication with a component data store 134 that stores information associated with components, such as confidence information regarding value and standard error associated with each component, information regarding the results of previous component selections, etc. While the purchase data store 130, activity data store 132, and component data store 134 are depicted in FIG. 1 as being local to component management server 120, those skilled in the art will appreciate that one or more of these data stores may be remote to the component management server 120, may be local to the retail server 110, and/or may be network-based services themselves.

In the environment shown in FIG. 1, the computing device 102 may communicate with the retail server 110 via a communication network 108, such as the Internet or other communications link. Those skilled in the art will appreciate that the network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The system 100 is depicted in FIG. 1 as operating in a distributed computer environment comprising several computer systems that are interconnected using one or more computer networks. However, it will be appreciated by those skilled in the art that the system 100 could equally operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and/or peer-to-peer network configurations to implement at least a portion of the processes.

Figure 3:
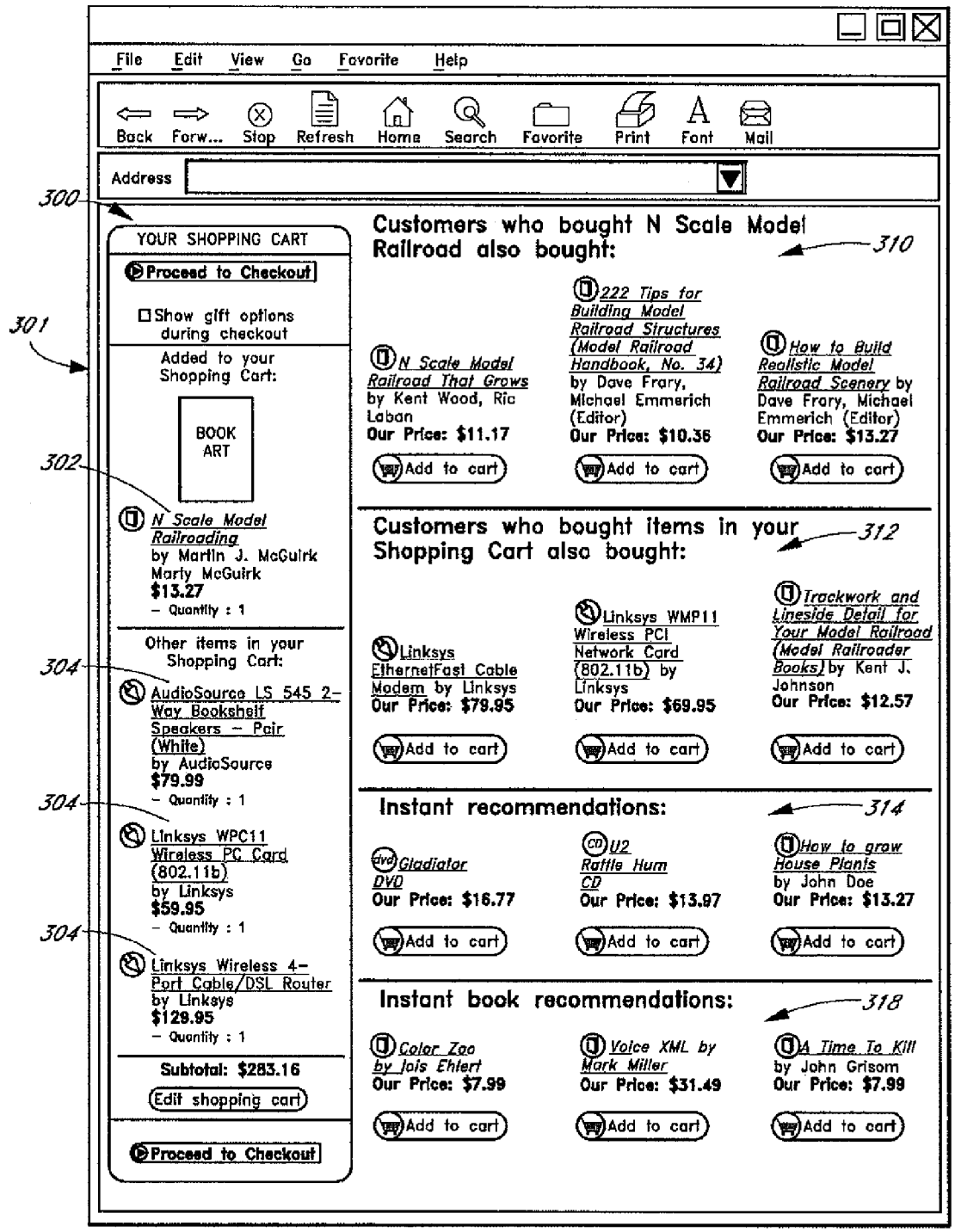
FIG. 3 is an illustrative user interface generated in part by the component management server that includes content generated by components selected by the component management server.

In brief, the retail server 110 is generally responsible for providing front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices. A non-limiting example of such a user interface is shown in FIG. 3.

The retail server 110 may obtain information on available goods and services (referred to herein as "items") from item data store 112, as is done in conventional electronic commerce systems. In one embodiment, the item data store 112 includes information on items available from a plurality of sellers (as opposed to storing information for only a single vendor). In certain embodiments, the retail server 110 may also access item data from other data sources, either internal or external to system 100. Accordingly, the retail server 110 may obtain item information for items offered for sale by a plurality of sellers. A user may then purchase items from a plurality of sellers in a single transaction or order placed with the retail server 110. In other embodiments, the user may purchase items from a single vendor in a single transaction or order placed with the retail server 110.

As described below in reference to FIG. 2, the component management server 120 may include a processing unit, a memory unit, an optional display, and a network interface, all of which may communicate with one another by way of a communication bus. The retail server 110 may be similarly arranged. A network interface included in the order management system 120 is preferably connected to one or more computer networks that connect to other components in the system 100. A processing unit may thus receive information and instructions from other computing components, such as the retail server 110 and item data store 112, via the network interface.

Figure 2:
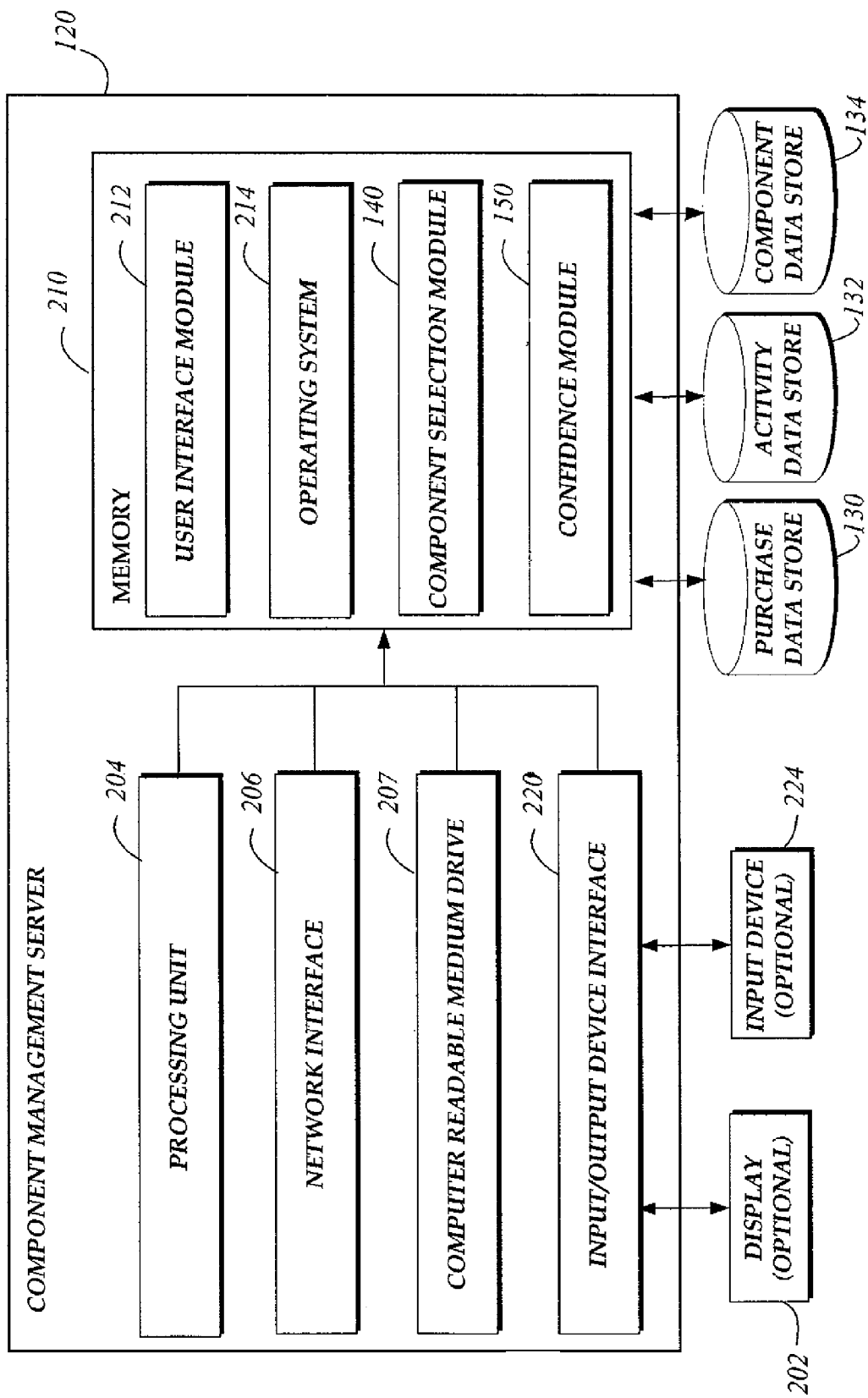
FIG. 2 depicts a general architecture of a component management server for selecting components for inclusion in portions of a displayable file and managing confidence levels of the components.

FIG. 2 depicts a general architecture of a component management server 120 for selecting components for inclusion in portions of a displayable file and managing confidence data associated with the components. Confidence data for a given component generally refers to data indicating a level of confidence that that the component will be effective (e.g., have a desired result) when it displays content to a user. The general architecture of the component management server 120 depicted in FIG. 2 includes an arrangement of computer hardware and software components that may be used to implement aspects of the present disclosure. Those skilled in the art will appreciate that the component management server 120 may include many more (or fewer) components than those shown in FIG. 2. It is not necessary, however, that all of these generally conventional components be shown in order to provide an enabling disclosure. As illustrated in FIG. 2, the component management server 120 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from an optional input device 224, such as a keyboard, mouse, digital pen, etc.

The memory 210 contains computer program instructions that the processing unit 204 executes in order to implement one or more embodiments. The memory 210 generally includes RAM, ROM and/or other persistent, non-transitory memory. The memory 210 may store an operating system 214 that provides computer program instructions for use by the processing unit 204 in the general administration and operation of the component management server 120. The memory 210 may further include computer program instructions and other information for implementing aspects of the present disclosure. For example, in one embodiment, the memory 210 includes a user interface module 212 that generates user interfaces and/or displayable files (and/or instructions therefor) for display upon a computing device, e.g., via a navigation interface such as a web browser installed on the computing device. In addition, memory 210 may include or communicate with one or more auxiliary data stores, such as purchase data store 130, activity data store 132, and component data store 134, discussed above. In addition to the user interface module 212 and operating system 214, the memory 210 may include a component selection module 140 and confidence module 150, discussed above in reference to FIG. 1, both of which may be executed by the processing unit 204.

FIG. 3 is an illustrative user interface which may be generated in part by the component management server 120 and/or in part by the retail server 110. The illustrative user interface may be considered to present one example of a displayable file that includes content generated by components selected by the component management server 120. In the illustrated example, the illustrated user interface may be presented to the user after the user adds an item 302 to a shopping cart. Accordingly, for purposes of the following description, the illustrated user interface may be referred to as shopping cart add page 301. In the illustrated example, the user interface includes a condensed view or representation 300 of the contents of the shopping cart. The user interface also includes multiple portions 310, 312, 314 and 318, each of which displays content that has been determined by a component, where the component for each portion has been selected according to the methods described herein. In the illustrated example, the components selected for portions 310, 312, 314 and 318 each display a different set of recommended items selected from an item data store according to a code module associated with the given component. In some embodiments, a given component may return a greater number of items than the component management server will display, and two or more components may return one or more of the same items. In these instances, the component management server may determine which items to display in each portion based on a predetermined priority assigned to each portion, as will be discussed below. While the illustrated portions all contain item recommendations, it is to be appreciated by one of skill in the art that a component selected for a given portion may, according to some embodiments, display content other than item recommendations.

In the illustrated embodiment, the most recent addition 302 to the shopping cart is prominently displayed with an accompanying graphic to signal to the user that the selected item was added to the cart as desired. In one embodiment, the user can add multiple items to the cart at a time, in which case all of the just-added items will be highlighted in this manner. The condensed shopping cart view 300 also lists preexisting items 304 that the user has previously added to the shopping cart.

With further reference to FIG. 3, the non-shopping-cart or "recommendations" section of the shopping cart add page 301 is populated with multiple recommendation portions 310, 312, 314 and 318, each of which displays a respective set of items selected by a given component, where the components have been selected by the component management server 120. For instance, the illustrated example of FIG. 3 includes a "shopping cart recommendations" portion 312 in which the listed items are selected based on the current contents of the shopping cart. In some embodiments, the content displayed in portion 312 may have been generated by a component that, when selected to be included in a portion of a file, always recommends items based on the current contents of the shopping cart. However, in some embodiments, the component that generated the content in portion 312 may not always base its displayed content on the items in the user's shopping cart. For example, in certain contexts the component may determine that a different recommendation method should be used.

The shopping cart add page 301 also includes an "instant recommendations" portion 314 in which the items may be selected, for example, by a component that bases recommendations on the user's purchase history and/or items the user has previously rated. The items displayed by the component selected for portion 314 may tend to reflect the user's general interests, and thus extend beyond the purpose of the current shopping session. Further, the page includes an "instant book recommendations" portion 318 which corresponds to the product category (books) of the item 302 just added to the shopping cart. The component which was selected by the component management server 120 to generate the content in portion 314 may, for example, generate recommendations of items in the same category as the item 302 just added to the shopping cart, or may alternatively always generate book recommendations regardless of the category of item 302.

The shopping cart add page 301 further includes a portion 310 displaying other items that have co-occurred relatively frequently within the purchase histories of those who have purchased the item just added to the shopping cart. This section 310 may be generated by a component which selects items by accessing a similar items table based on user purchase histories to obtain a similar items list for the item 302 just added to the cart, and may filter out from this list any items currently in the cart. While the illustrated portions 310, 312, 314 and 318 each display three items, the component selected for any given portion may return large lists of items or other content. The component management server 120 determines which of the items selected by each component to include in the respective portion, as discussed below.

The particular set of components selected by the component management server 120 to generate the content displayed in portions 310, 312, 314 and 318 may be selected dynamically from a larger set of components according to the methods described herein. In some embodiments, the component management server may have a predetermined number of portions for which it selects components to display content, while in other embodiments the component management server may vary the number of portions displayed on the page. In some embodiments, the number of portions displayed may be selected to correspond generally to the height of the condensed shopping cart view 300, such that the number of portions displayed is generally proportional to the number of items currently in the shopping cart. In some embodiments, the number of portions may be determined based on the dimensions of a display on which the file is displayed or the dimensions of a window in which the file is displayed. The component management server may attempt to select components for a greater number of portions than are eventually displayed if one or more selected components are not available or otherwise fail to generate content, as described in more detail below.

Figure 4:
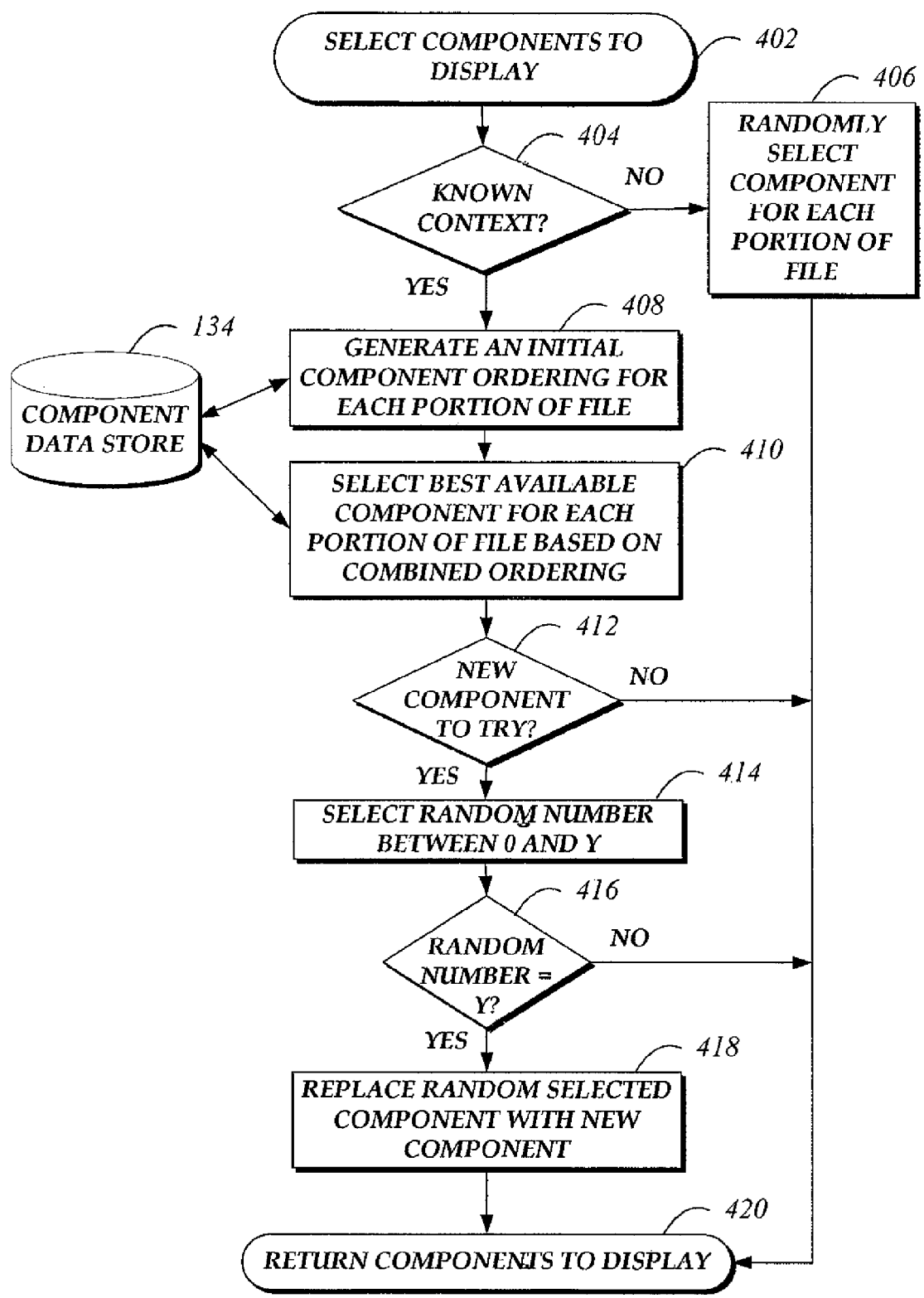
FIG. 4 is a flow diagram of an illustrative method implemented by the component management server for selecting components to display in portions of a displayable file.

FIG. 4 is a flow diagram of an illustrative method implemented by the component management server 120 for selecting components to display in portions of a displayable file, such as shopping cart add page 301. The method begins at block 402, then proceeds to block 404, where the component management server determines whether the displayable file is associated with a known context. A context may represent a state of a user and/or a user browsing session associated with the request for a displayable file. The context associated with a particular displayable file may optionally reflect the browsing and/or purchase histories of users of a web site, such that components presented on portions of similarly generated displayable files over a given time period vary from user to user. For example, in some embodiments, if a current visitor to a web page is a frequent user of the web site, a component may be selected that has frequently produced a desirable result (e.g., an item purchase) when presented to other frequent users on that web page. On the other hand, new customers who access the same web page may be presented with a different component that has been particularly effective when presented to new customers. A context may be determined based on a variety of information, for example, user purchase histories, items in the user's shopping cart, items in a user's wish list, pages or files that the user has recently viewed, personal information of the user (such as geographic location), etc. For example, according to some embodiments in which the context is determined based on an item in the user's shopping cart, the content management server may determine that the context is "electronics" if the last item that the user added to his shopping cart is associated with the "electronics" product category, or a sub-group of the "electronics" product category. The context may be relevant to the component selection process because the effectiveness of a given component may depend on the context. For example, a component that generates a list of items that may be considered an "accessory" to the item most recently added to the user's shopping cart may be more effective in the "electronics" context than in the "books" context, as the notion of an "accessory" is not particularly applicable to a book. In some embodiments, confidence data is stored for each known context, and the set of known contexts is manually set. In other embodiments, the set of known contexts may be automatically adjusted by the component management server, for example, as new item categories are added to a catalog.

If the component management server 120 determines at block 404 that the displayable file is not associated with a known context, then the component management server may randomly select a component for each portion of the displayable file at block 406. For example, if the displayable file contains four portions, the component management server may randomly select four components to generate content, where one component is selected for each portion of the displayable file. In other embodiments, the component management server may non-randomly select components for display in an unknown context. For example, the component management server may select the most effective overall components based on combining confidence data across a variety of contexts. In other embodiments, the component management server may store component confidence data for unknown contexts and use this confidence data to select components to display in an unknown context in a manner similar to that described below with respect to a known context.

If the component management server 120 determines at decision block 404 that the displayable file is associated with a known context, then the component management server generates an initial component ordering for each portion of the displayable file at block 408. The initial component ordering for each portion is determined based in part on component confidence data retrieved from component data store 134. Determining the initial component ordering for each portion of the displayable file is described in more detail in reference to FIG. 5 below. As will be discussed below, the confidence data considered in determining the initial ordering may be specific to the current context. The result of block 408 is an initial ranked list of components for each portion of the displayable file. For example, an abstract representation of the initial component ordering for a displayable file with three portions, where each component is identified by a letter, may be as follows: (Portion 1: {D, A, B, K, L . . . }); (Portion 2: {D, B, L, X, R . . . }); (Portion 3: {B, L, K, A, C . . . }). Portions are discussed above in reference to the displayable file illustrated in FIG. 3, which includes portion 310, portion 312, portion 314 and portion 318.

At block 410, the component management server 120 selects the best available component for each portion of the file based on the combined initial component ordering. In some embodiments, the component management server selects the component for each portion of the displayable file based in part on a predetermined priority assigned to each portion. For example, if the portions of the displayable file are to be displayed such that the first portion is above the second portion, the second portion is above the third portion, and so on (such as the arrangement of portions 310, 312, 314 and 318 in FIG. 3), the portions may have a predetermined priority assigned where the first portion has first priority, the second portion has second priority, etc. This priority information may be initially determined, for example, because users may be more likely to select content displayed near the top of a displayable file than in the middle of a displayable file. Therefore, if both portion one and portion two have the same component, Component D, listed first in their respective initial component orderings, the combined effectiveness of portion one and portion two may be higher if Component D is selected to display content in portion one than if it were instead selected to display content in portion two.

While in some embodiments a given component may be shown in more than one portion, this may be less effective than selecting a different component for every portion. For example, while in some embodiments a component may display any type of content, consider an example embodiment in which each component displays content consisting of one or more recommended items. In some such embodiments, the component management server 120 may determine items to show in each portion of the displayable file such that a given item is never shown twice in the same displayable file (e.g., in two different portions of the displayable file), even if two different components each return that same item, as will be discussed in more detail below. If, for example, the component management server selects three items for each portion (where the three items for a given portion are selected by the component management server from among a greater number of items returned by the component selected for the given portion), and if the top three items returned by Component D are displayed in portion one, it may be more effective to display the top three items returned by Component B in portion two than it would be to display items four through six returned by Component D in portion two.

In some embodiments, a component may not always be available, where availability generally refers to the component's ability to return content which may be displayed in a portion of the displayable file. A component may be considered unavailable, for example, if it is stored or executed on a server that is unavailable or unresponsive, it is requested by the component management server 120 to return content and fails to return content within a predetermined period of time, or its associated code module determines that the component has no content to display based on the context, user purchase history, items in the user's shopping cart, etc. For example, a component that generally displays item recommendations based on items in a user's wish list may have no content to display if the given user has no wish list. In other embodiments, all components may be considered as always available, such that the component management server does not determine whether content will be returned by the component in selecting the best component for each portion of the displayable file.

Continuing the example ordering above, consider block 410 of FIG. 4, according to some embodiments, with reference to the initial component ordering abstractly represented as (Portion 1: {D, A, B, K, L . . . }); (Portion 2: {D, B, L, X, R . . . }); (Portion 3: {B, L, K, A, C . . . }). Assume, for sake of example, that portion one has higher priority than portion two, and portion two has higher priority than portion three. The component management server 120 may request that Component D return content to display in portion one because portion one has the highest priority, and Component D is the highest ordered component in the initial ordering for portion one. In some embodiments, the component management server may additionally request content from one or more of the next highest ordered components in the initial ordering for portion one. Content may be requested from additional components, for example, in order to provide backup content in case Component D is not available or does not return content. For example, in some embodiments, the component management server may retrieve availability data from the component data store 134 which indicates the percentage of the time that each component is available and/or returns content when requested. The component management server may request content from the N highest ordered components for portion one, where N is determined such that the combined percentage of the N highest ordered components indicates that at least one of the N components will return content a predetermined percentage of the time (e.g., 99.9% of the time). For a given subsequent portion, if all N components that have been requested for the given portion are unavailable to return content to display, in some embodiments, the component management server may select an unused component from a previous portion. For example, if all N components requested by the component management server for portion two are unavailable to return content, the component management server may select a component for portion two from which the component management server previously requested content during component selection for portion one, but which was not selected as the best available component for portion one.

If the component management server 120 selects Component D as the best available component for portion one, given the above example initial component ordering, the component management server may then select Component B for portion two, as Component B is the best available component for portion two (according to the initial component ordering for portion two) that has not already been selected for a portion having higher priority than portion two. While Component D is the highest ordered component for portion two, it has already been selected for portion one, which has a higher priority than portion two. Assuming that both Component D and Component B are available, the component management server may then select Component L to display content in portion three, as Component B, the highest ordered component for portion three, has already been selected for portion two. If instead, for example, Component B was unavailable, the component management server may select Component L for portion two and select Component K for portion three.

Once the component management server 120 has selected the best available component for each portion of the file, the component management server determines whether there is a new component to try at block 412. For example, in some embodiments, the component management server may only consider components for which confidence data exists when generating the initial component ordering at block 408. Therefore, in some embodiments, a new component may have been added to the system but may not yet have associated confidence data. A component may not have associated confidence data if it has never displayed content in a portion of a displayable file, or if the current confidence data does not yet reflect that the component has been displayed (for example, because the generated confidence data may lag behind the actual activity data, as discussed below). In some embodiments, a component which has displayed content less than a predetermined number of times may also be considered a "new" component at decision block 412. In other embodiments, a component which has been shown a small number of times but which has not yet been effective may not be considered new, but instead may be artificially assigned a non-zero standard error, as discussed in more detail in reference to FIG. 6 below. If the component management server 120 determines that there are no new components associated with the component management server, the component management server returns the components to display as previously determined at block 410. If the component management server instead determines that there are one or more new components to try, the component management server proceeds to block 414, where it selects a random whole number between zero and Y, where Y is a predetermined number that indicates how frequently a new component should be tried (e.g., Y would be set to 100 if a new component should be tried 1% of the time, or once every 100 trials). For example, if a large number of trials will occur between updates to the confidence data (e.g., if confidence data is updated once a day, but components are called to display content thousands of times an hour), it may be desirable to set Y to be a large number so that a poorly performing new component is not shown too frequently prior to its effectiveness being updated in the confidence data.

At decision block 416, the component management server 120 determines whether the randomly generated number equals Y. If the randomly generated number equals Y, and the new component is available, the component management server replaces one of the components previously selected at block 410 with the new component at block 418. The component to replace may be randomly selected, may always be the component selected for the lowest priority portion, etc. If there is more than one new component, the component management server may randomly select one of the new components, or may repeat blocks 414 and 416 for each new component. At block 420, the component management server returns the components to display in each portion of the displayable file.

Once the component management server 120 determines which component to display in each portion of the file, it may then determine which content returned by each component should be displayed in the various portions of the displayable file (not shown). In some embodiments, the component management server may consider the predetermined priority of each portion in order to assure that the same item is not displayed more than once (e.g., in two different portions, or by two different components). For example, if each component selected for a portion of the displayable file returns a list of items, and the component management server is set to display three items in each portion of the displayable file, the component management server may display in the highest priority portion the first three items returned by the component selected for the highest priority portion. For each lower priority portion, the component management server may display the first three items returned by the component selected for the given portion that have not already been selected for display in a higher priority portion. This concept may be abstractly thought of as a component selected for a higher priority portion "stealing" content from a component selected for a lower priority portion.

Figure 5:
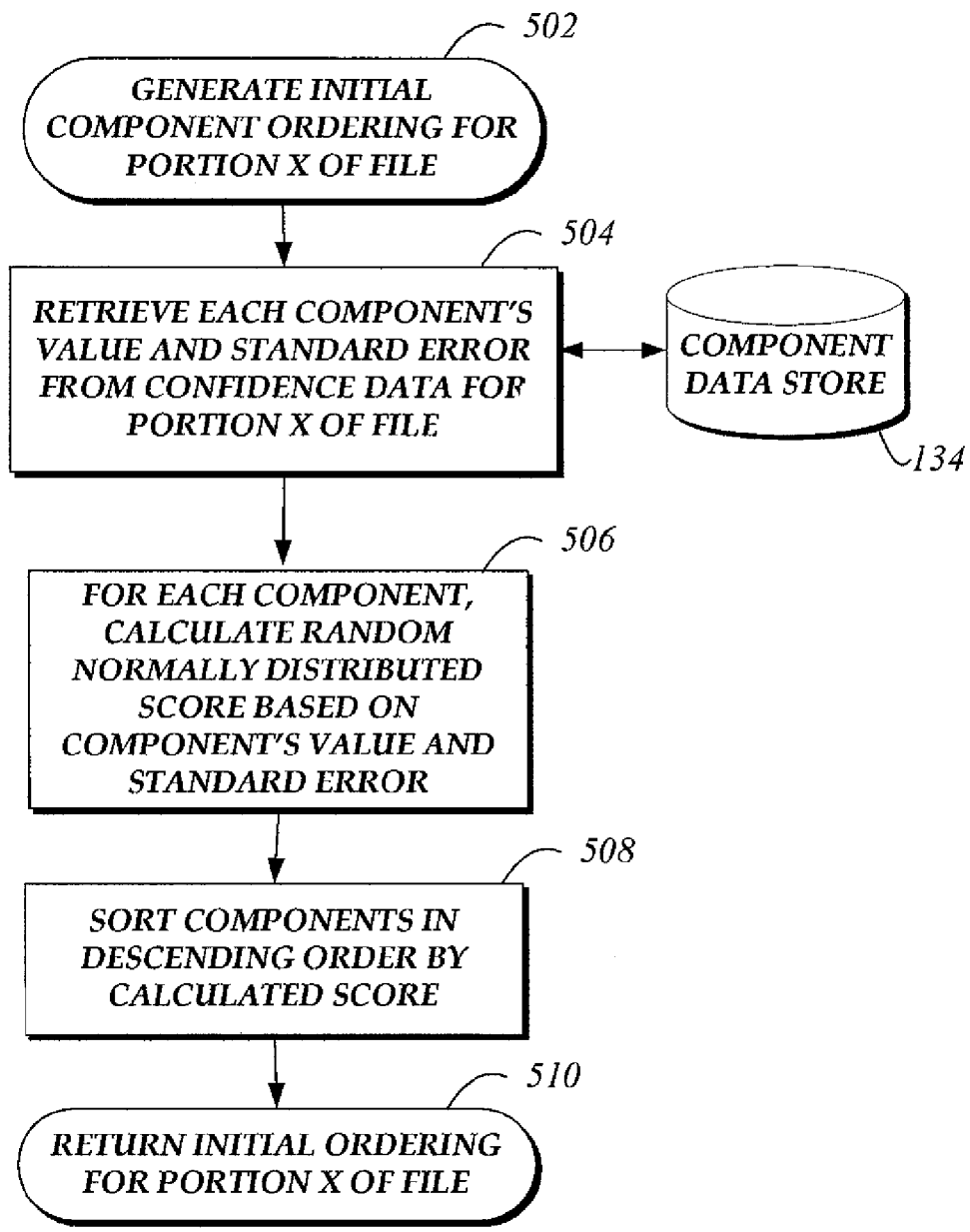
FIG. 5 is a flow diagram of an illustrative method implemented by the component management server for generating an initial ordering of components for a given portion X of a displayable file.

FIG. 5 is a flow diagram of an illustrative method implemented by the component management server 120 for generating an initial ordering of components for a given portion X of a displayable file, such as at block 408 of FIG. 4. The component management server may generate a separate initial component ordering for each portion of the displayable file for which content is to be displayed. For example, with reference to FIG. 5, blocks 502-510 may be repeated for each portion of the displayable file. In other embodiments, the component management server 120 may generate a single initial component ordering to be used in selecting a component for each portion of the displayable file. The method begins at block 502, then proceeds to block 504, where the component management server retrieves confidence data from component data store 134. The confidence data stored in component data store 134 is discussed in more detail with reference to FIG. 6 below. Confidence data generally includes a value and standard error associated with each component based on the effectiveness of the component when it has previously displayed content in a displayable file. The "effectiveness" of a component may be based, for example, on a performance metric that the component management server aims to maximize. For example, effectiveness may refer to the percentage of the time during previous exposures of a component (e.g., previous times that the component displayed content in a displayable file) that a user selected content displayed by the component, that a user purchased an item that the component displayed to the user, etc. In some embodiments, effectiveness may consider the price of items purchased or viewed, the number of units sold, etc.

In some embodiments, the component management server 120 may consider only the confidence data associated with a specific portion of a displayable file in generating the initial component ordering. For example, when generating the initial component ordering for portion two of the displayable file, the component management server may only consider confidence data regarding previous times that the various components have been displayed in portion two of a displayable file. The confidence data may be portion-specific, for example, because a certain component may perform relatively well in comparison to other components when shown in a high priority portion, but may perform relatively poorly when shown in a lower priority portion. A given component may perform relatively poorly in a low priority portion, for example, because it may return items that are commonly returned by other components and are thus likely to not be shown by the given component when it is selected for a low priority portion (in embodiments where the component management server does not display duplicate items).

Once the value and standard error for each component is retrieved, the illustrated method proceeds to block 506. At block 506, the component management server 120 calculates, for each component, a random Gaussian distributed score based on the component's value and standard error. For example, the score for a given component may be a random Gaussian distributed number that has a mean value equal to the retrieved value for the component and a standard deviation equal to the retrieved standard error for the component. Once a score has been determined for each component, the component management server sorts the components in descending order by calculated score at block 508, and returns this initial ordering for portion X of the displayable file at block 510.

Suppose, for example, that Component A has a retrieved value of 1.5 and a retrieved standard error of 0.1, while Component B has a retrieved value of 0.8 and a retrieved standard error of 0.1. According to a normal distribution of scores, about 68% of the scores will lie within one standard deviation of the retrieved value, about 95% of the scores will lie within two standard deviations of the retrieved value, and about 99.7% of the scores will lie within three standard deviations of the retrieved value. Thus, 68% of the time the score for Component A would be between 1.4 and 1.6, while 68% of the time the score for Component B would be between 0.7 and 0.9. Furthermore, 99.7% of the time the score for Component A would be between 1.2 and 1.8, while 99.7% of the time the score for Component B would be between 0.5 and 1.1. Thus, the confidence data indicates that the component management server 120 should select Component A over Component B for portion X over 99.7% of the time (since the ranges do not overlap at three standard deviations).

Figure 6:
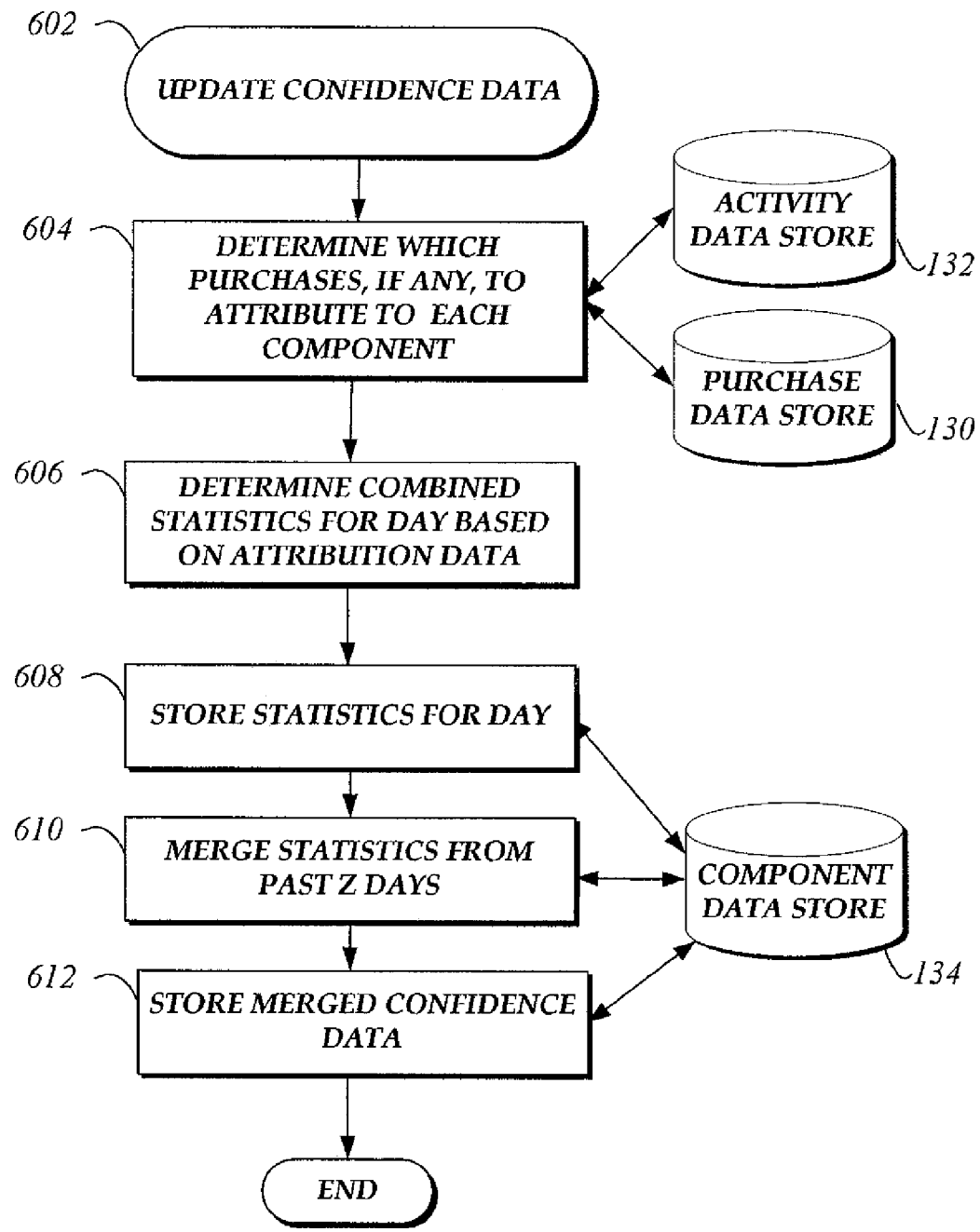
FIG. 6 is a flow diagram of an illustrative method implemented by the component management server for updating component confidence data.

FIG. 6 is a flow diagram of an illustrative method implemented by the component management server 120 for updating component confidence data based on users' activity after being presented with various components' content. The illustrative method may be implemented at least in part by confidence module 150. While the confidence data is illustrated as being updated once per day, the confidence data may be updated more or less frequently depending on factors such as the effectiveness metric sought to be maximized and the potential delay between a user being presented with a component's content and the user performing the desired action. The method begins at block 602, then proceeds to block 604, where the component management server determines which purchases, if any, to attribute to each component. This determination may include retrieving data from activity data store 132 and/or purchase data store 130, and is described in more detail in reference to FIGS. 7A and 7B below. Consider, for example, an embodiment in which each component's effectiveness is measured by the likelihood of a user purchasing an item shown to the user by the given component. In such a case, the resulting attribution data may include information regarding the number of times in the last day that a user purchased an item after having been shown the item by a component, along with an indication of the component that displayed the item to the user and the portion of the displayable file in which the component displayed the item.

In some embodiments, once the attribution data is determined, the component management server 120 determines the combined statistics for the day based on the attribution data. For example, suppose that the attribution data indicates the number of times that users purchased an item in the past day after being shown the item by Component A in a given portion of a displayable file. In this case, determining the combined statistics for the day may include accessing the activity data store 132 to determine the total number of times in the past day that Component A has been shown to users in that portion of a displayable file. The resulting combined statistics may include, for each component and portion pair, the number of times that the given component was shown in the given portion of a displayable file and the number of times that the component was effective when presented in that portion of the file (e.g., based on the above example, the number of times that a user subsequently purchased an item shown by the component when the component was displayed in that portion of a displayable file). The component management server stores the combined statistics for the day in component data store 134 at block 608. In some embodiments, the component data store 134 may separately store statistics for each day for at least the past Z days, such that the component management server may merge statistics from the previous Z days, as described below.

At block 610, the component management server 120 merges statistics from the past Z days to generate value and standard error numbers for each component and portion combination. The value and standard error numbers may be generated from the merged statistics using known methods for generating summary statistics from a set of data. For example, in some embodiments, the stored value may be a mean value based on the number of times the component was shown and the sum of the item purchases attributed to the component. The value may generally be based on any metric that could be used to measure effectiveness or success rate of a component, and may be based on statistical data other than a mean value. In some embodiments, this merged confidence data is the confidence data considered by the component management server in selecting components to display in portions of a displayable file. The merged confidence data may be generated in full and replaced each day, or other time period, such that the merged confidence data reflects a rolling window of Z days. For example, reasons that it may be predetermined that confidence data should only be based on the past 60 days of component data, rather than considering data older than 60 days, may include if components or the associated code modules may be changed, or if it is anticipated that users' preferences or behavior may change over time. If a component has been improved, or if users' preferences have changed, it may be desirable for older data to be phased out, such that the confidence values are not continually biased by less useful older data. In some embodiments, the component management server may additionally or alternatively assign a decay factor to each day's data when generating the merged confidence data, such that the more recent data is more heavily weighted. The decay factor may be predetermined, and may be specific to a given context. For example, statistics for the "electronics" context may decay at a faster predetermined rate than the "books" context.

In some embodiments, when determining the value and standard error data from the past Z days' statistics, the component management server 120 may add one to the combined exposure count and the combined success or effectiveness count (e.g., may add one to both the number of times a component was shown in the past Z days and the number of times a component resulted in a unit sold in the past Z days), effectively assuming that the next time the component is displayed, it will be effective. This assumption may overcome the problem of determining a standard deviation of zero in the case of a component which has been displayed but which has not yet been effective. Once the component management server generates the merged confidence data, the merged confidence data is stored in component data store 134.

Figure 7A:
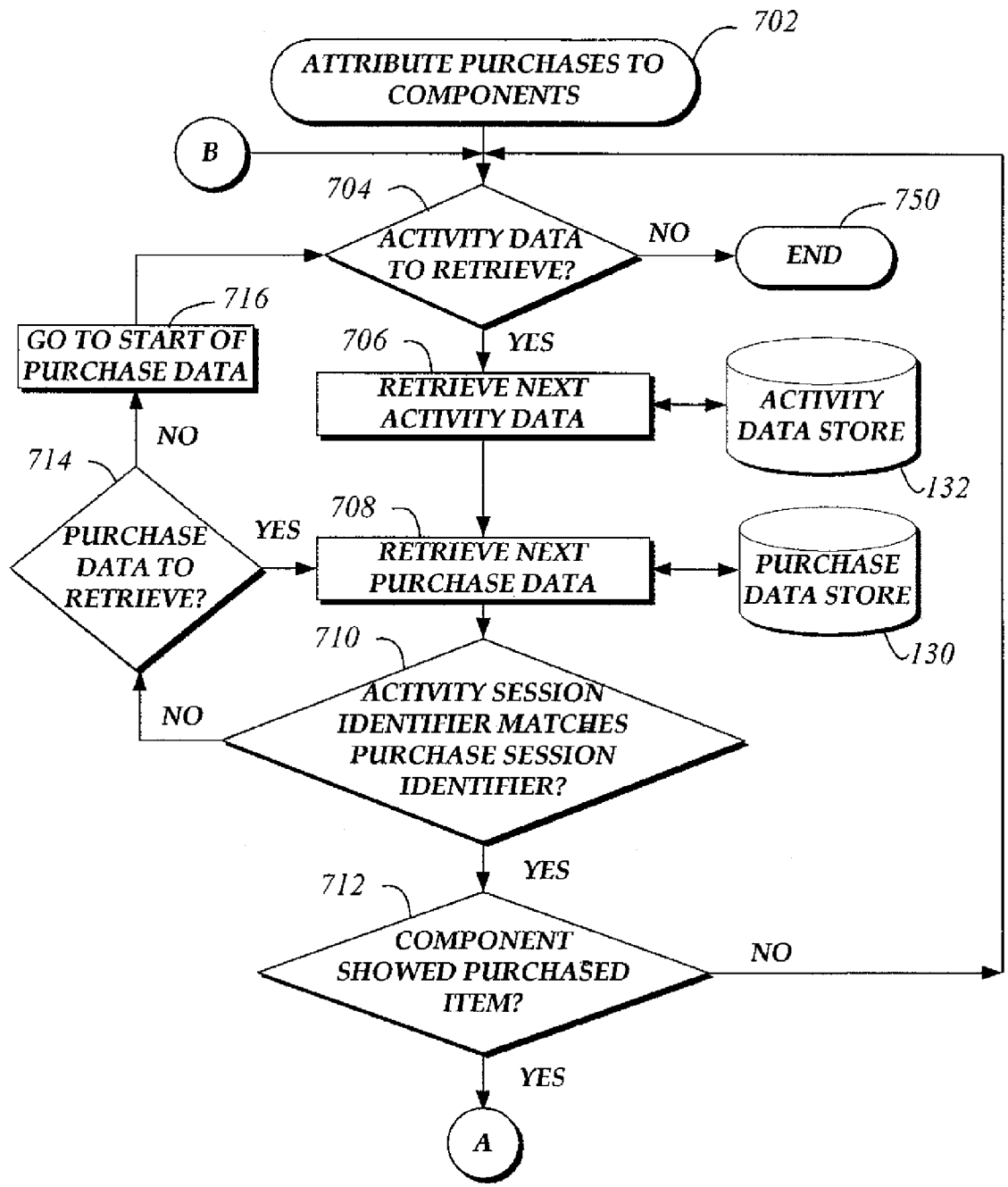
FIGS. 7A and 7B are flow diagrams of an illustrative method implemented by the component management server for attributing purchases to components.
Figure 7B:
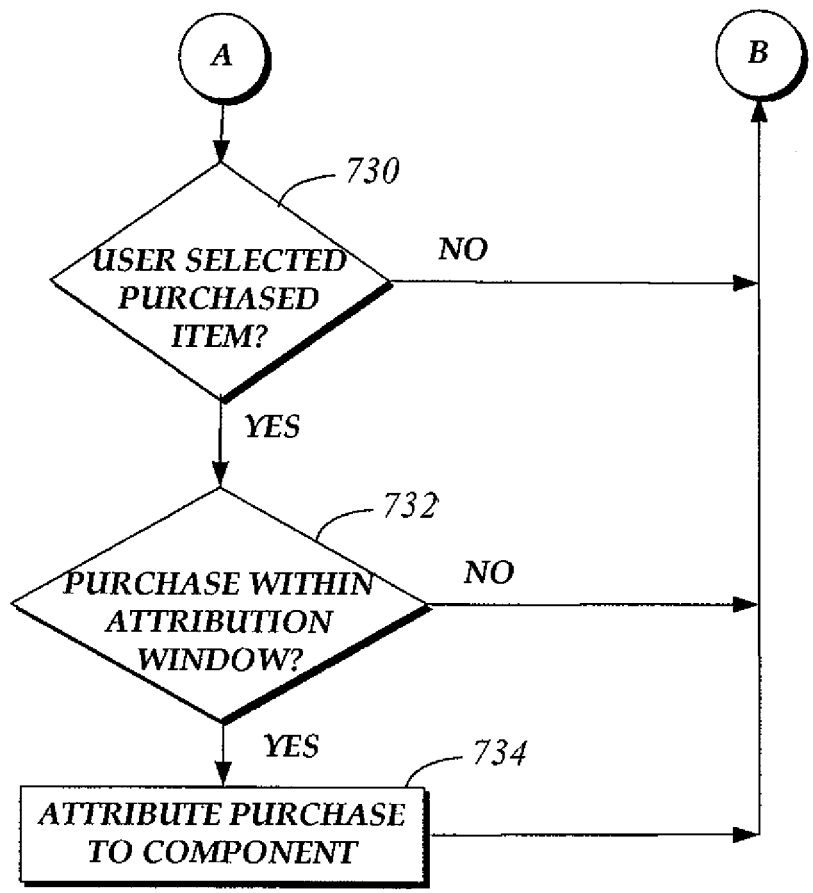

FIGS. 7A and 7B are flow diagrams of an illustrative method implemented by the component management server 120 for attributing purchases to components, such as may occur at block 604 of FIG. 6. In some embodiments, the illustrative method may be implemented on a set schedule, such as daily, to determine whether components that have recently been displayed have been effective. The method is described in terms of an embodiment in which effectiveness of a given component is determined based on the likelihood of a user purchasing an item after the user is shown the item by the given component. However, any metric could be used to measure effectiveness or success rate of a component, and the method could consider data other than units purchased, such as the number of times a user selected an item or other content shown by a component, the total amount of money spent by the user after viewing a component, etc. The method is described in terms of a system in which activity data and purchase data are stored in one or more data stores, such as activity data store 132 and purchase data store 130. As discussed above, purchase data store 130 may store information associated with completed purchases, such as information identifying the items included in an order, a session identifier, information identifying the user or customer, shipping information, etc. Activity data store 132 may store information associated with users' browsing or viewing activities and a given session identifier, such as information regarding the pages or files that a user viewed and the content selected by a user in a given session. In other embodiments, the system may store activity data and purchase data together, such as by session identifier, in which case the method described in reference to FIGS. 7A and 7B below may not include two separate loops through the activity and purchase data. In some embodiments, the activity data and purchase data may each be stored in sorted order, such that the data may be parsed linearly without two separate loops, as discussed further below.

The method begins at block 702, then proceeds to decision block 704, where the component management server 120 determines whether there is new activity data to retrieve from the activity data store 132. In some embodiments, block 704 may be the beginning of a loop in which each previously unconsidered entry of activity data is compared with the purchase data in order to find activity data and purchase data that share a common session identifier, as retrieved from the respective data store(s). In embodiments in which an "attribution window" is considered (e.g., a 90 minute window, as described below), the component management server may consider purchase data from a time period that extends through 90 minutes after the latest activity data to be considered. If there is no activity data to retrieve, the method ends at block 750. If there is activity data to retrieve, the component management server retrieves the next activity data at block 706. For example, an individual entry of activity data may be activity data of a user during a particular session, identified by session identifier. The activity data may include, for example, the components that were displayed to the user, the portion of the displayable file in which each component was displayed, content that the user selected, etc. The component management server then retrieves the next purchase data at block 708. For example, an individual entry of purchase data may include information regarding the items purchased by a user in a particular session, identified by session identifier. At decision block 710, the component management server determines whether the retrieved activity data entry and the retrieved purchase data entry are associated with the same user session. For example, the component management server may determine whether the session identifier from the retrieved activity data entry matches the session identifier from the retrieved purchase data entry. If the session identifiers do not match, the component management server may continue the loop through the data by determining if there is additional purchase data to consider for the current activity data entry at decision block 714, and if so, proceeding to block 708. If all of the purchase data has been compared with the current activity data entry, the component management server goes to the start of the purchase data at block 716 and proceeds to decision block 704 to determine if there are additional activity data entries to consider.

If the component management server 120 determines at decision block 710 that the session identifier from the retrieved activity data entry matches the session identifier from the retrieved purchase data entry, the component management server proceeds to decision block 712, where the component management server determines whether a component showed the purchased item to the user. The component management server may make this determination, for example, by retrieving one or more item identifiers from the purchase data, where the purchase data indicates that the one or more items having the given item identifiers were purchased during the given user session, and determining whether the activity data entry with the matching session identifier indicates that a component displayed one or more of these purchased items to the user. If the component management server determines that the purchased item was not displayed to the user by a component, the component management server proceeds to decision block 704 to determine if there is additional activity data to retrieve. If the component management server determines that a component displayed the purchased item to the user, the component management server proceeds to block 730 of FIG. 7B.

At block 730 of FIG. 7B, the component management server 120 determines whether the user selected the purchased item when it was displayed by the component, which may be determined based on the user's browsing activity stored in the retrieved activity data. The component management server may check that the user selected the purchased item when it was displayed, for example, in order to avoid attributing a purchase to a given component when the user actually found and purchased the item through a different means, such as a subsequent search or a suggestion from a source other than the given component. If the user did not select the purchased item from the component which displayed the item, the component management server proceeds to decision block 704 to determine whether there is additional activity data to retrieve. If the user selected the purchased item from the component which displayed the item, the component management server may proceed to decision block 732 in order to determine whether the purchase was within a predetermined attribution window. In some embodiments, an item purchase may only be attributed to a given component if the user purchased the item within a certain amount of time (the attribution window) after the component displayed the item to the user. For example, the activity data may include information regarding the time that the component was displayed, and the purchase data may include information regarding the time that the purchase was confirmed by the user. If the attributed window is predetermined to be 90 minutes, for example, at decision block 732 the component management server may determine whether the difference in time between the component display and the purchase confirmation is less than 90 minutes. If the component management server determines that the purchase was within the attribution window, the component management server attributes the purchase to the component at block 734. In some embodiments, the attribution information may further indicate the portion of the displayable file in which the component was displayed, as may be stored in the activity data, and/or the context in which the component was displayed. The component management server then proceeds to decision block 704 to determine if there is additional activity data to retrieve.

While FIGS. 7A and 7B illustrate an embodiment which includes two separate loops through the activity and purchase data, in some embodiments, the activity data and purchase data may be parsed linearly without two separate loops. For example, if the activity data and purchase data are each sorted in ascending order by session identifier, the component management server may initially set an activity session parser and a purchase session parser at the first entry in the respective data. The component management server may then advance the activity session parser when the current activity session identifier is less than the current purchase session identifier, or advance the purchase session parser when the current purchase session identifier is less than the current activity session identifier. If the current activity session identifier matches the current purchase session identifier, the component management server may determine whether to attribute the purchase to the component (as discussed above in reference to blocks 712, 730, 732 and 734). Once the component management server has determined whether to attribute the purchase to the component, the component management server may advance both the activity session parser and the purchase session parser. The component management server may continue to advance the parsers according to the above rules until each parser reaches the end of its respective data.

As discussed throughout the present disclosure, the above methods may provide an approximate solution to variations of the multi-armed bandit problem that may arise in component selection. Consider, for example, an embodiment in which more than one component may need to be selected, such that a different component is included in each portion of a displayable file. In such an embodiment, as discussed above, selecting components for inclusion in each portion of the displayable file may include determining an order of the components for each portion of the displayable file. The components' order for a given portion may be based on a score for each component, where a component's score is a random normally distributed number based on an estimated value and standard error associated with the component. Once a component order has been determined for each portion of the displayable file, the component to include in each portion of the displayable file may be selected based at least in part on the determined component order for each portion and a predetermined priority of each portion, where the component selected for a given portion of the displayable file is the highest ordered available component that has not been previously selected for another portion having a higher predetermined priority. Various methods described above may be implemented in order to solve additional variations that may arise in embodiments of a component selection problem, as described herein.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes, including but not limited calculation processes, described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a data store that stores information regarding a plurality of code modules that are each configured to dynamically select one or more items for display; and
a computing system, comprising at least one computing device that includes a hardware processor, the computing system in communication with the data store and configured to at least:
receive a request for a displayable file;
in response to the request, dynamically determine content to display within two or more portions of the displayable file, wherein determining the content to display comprises:
for each of the two or more portions of the displayable file:
retrieve a value for each of the plurality of code modules, the value for each code module representing an effectiveness of the code module based at least in part on data indicating a number of users that have purchased or selected items after said items were selected for display to said users by execution of the code module;
determine a score for each of the plurality of code modules based at least in part on the retrieved value associated with the code module; and
determine an order of at least two or more of the plurality of code modules based at least in part on the determined score for each code module; and
select a code module for each portion of the displayable file based at least in part on the determined order of the at least two or more of the plurality of code modules for each portion and a predetermined priority of each portion, wherein the code module selected for a given portion of the displayable file is a highest ordered available code module not previously selected for another portion having a higher predetermined priority; and
generate the displayable file at least in part by dynamically selecting one or more items for display within each portion of the displayable file, wherein the one or more items selected for display in each portion of the displayable file are dynamically selected by execution of the code module selected for the portion.

2. The system of claim 1, wherein the computing system further configured to at least retrieve a standard error associated with the value for each of the plurality of code modules.

3. The system of claim 1, wherein the displayable file is a web page.

4. The system of claim 2, wherein determining the score for each of the plurality of code modules comprises selecting a normally distributed number based at least in part on the value and standard error associated with the code module.

5. The system of claim 1, wherein the retrieved value for each code module is associated with a context in which the displayable file is requested.

6. The system of claim 5, wherein the context is determined based at least in part on one or more items previously selected by a user requesting the displayable file.

7. The system of claim 1, wherein the retrieved value for each code module is specific to the given portion of the displayable file.

8. A computer-implemented method comprising:
as implemented by one or more computing devices configured with specific executable instructions,
receiving a request for a displayable file;
in response to the request, dynamically determining content to display within two or more portions of the displayable file, wherein determining the content to display comprises:
for each of the two or more portions of the displayable file:
retrieving a value for each of a plurality of code modules, wherein each of the plurality of code modules is configured to dynamically select one or more items for display, the value for each code module representing an effectiveness of the code module based at least in part on data indicating a number of users that have purchased or selected items after said items were selected for display to said users by execution of the code module;
determining a score for each of the plurality of code modules based at least in part on the retrieved value associated with the code module; and
determining an order of at least two or more of the plurality of code modules based at least in part on the determined score for each code module; and
selecting a code module for each portion of the displayable file based at least in part on the determined order of the at least two or more of the plurality of code modules for each portion and a predetermined priority of each portion, wherein the code module selected for a given portion of the displayable file is a highest ordered available code module not previously selected for another portion having a higher predetermined priority; and
generating the displayable file at least in part by dynamically selecting one or more items for display within each portion of the displayable file, wherein the one or more items selected for display in each portion of the displayable file are dynamically selected by execution of the code module selected for the portion.

9. The computer-implemented method of claim 8, wherein the score for each code module is based at least in part on a standard error associated with the value for the code module.

10. The computer-implemented method of claim 9, wherein determining the score for each of the plurality of code modules comprises selecting a normally distributed number based at least in part on the value and standard error associated with the code module.

11. The computer-implemented method of claim 8, wherein a code module is considered effective when a user selects content displayed by the code module.

12. The computer-implemented method of claim 8, wherein a code module is considered effective when a user purchases an item displayed by the code module.

13. The computer-implemented method of claim 8, wherein the value for each code module is specific to the given portion of the displayable file.

14. The computer-implemented method of claim 8, wherein the value for each code module is associated with a context in which the displayable file is requested.

15. The computer-implemented method of 14, wherein the context is based at least in part on one or more items previously selected by a user requesting the displayable file.

16. The computer-implemented method of 14, wherein the context is based at least in part on one or more displayable files previously viewed by a user requesting the displayable file.

17. A non-transitory computer-readable medium storing computer-executable instructions that, when executed by a computer system, configure the computer system to perform operations comprising:
receiving a request for a displayable file;
in response to the request, dynamically determining content to display within two or more portions of the displayable file, wherein determining the content to display comprises:
for each of the two or more portions of the displayable file:
retrieving a value for each of a plurality of code modules, wherein each of the plurality of code modules is configured to dynamically select one or more items for display, the value for each code module representing an effectiveness of the code module based at least in part on data indicating a number of users that have purchased or selected items after said items were selected for display to said users by execution of the code module;
determining a score for each of the plurality of code modules based at least in part on the retrieved value associated with the code module; and
determining an order of at least two or more of the plurality of code modules based at least in part on the determined score for each code module; and
selecting a code module for each portion of the displayable file based at least in part on the determined order of the at least two or more of the plurality of code modules for each portion and a predetermined priority of each portion, wherein the code module selected for a given portion of the displayable file is a highest ordered available code module not previously selected for another portion having a higher predetermined priority; and
generating the displayable file at least in part by dynamically selecting one or more items for display within each portion of the displayable file, wherein the one or more items selected for display in each portion of the displayable file are dynamically selected by execution of the code module selected for the portion.

18. The non-transitory computer-readable medium of claim 17, wherein determining the score for each of the plurality of code modules comprises selecting a normally distributed number based at least in part on the value and a standard error associated with the code module.

19. The non-transitory computer-readable medium of claim 17, wherein the value for each code module is associated with a context in which the displayable file is requested.

* * * * *